United States Patent
Kinch et al.

(10) Patent No.: US 9,803,638 B2
(45) Date of Patent: Oct. 31, 2017

(54) CONTROL CIRCUIT FOR TRANSMISSION VARIABLE DISPLACEMENT PUMP WITH IMPROVED EFFICIENCY

(75) Inventors: Derek B. Kinch, Ypsilanti, MI (US); Mark Richard Dobson, Howell, MI (US); Lev Pekarsky, West Bloomfield, MI (US); Hrudaya Mahapatro, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1369 days.

(21) Appl. No.: 13/363,040

(22) Filed: Jan. 31, 2012

(65) Prior Publication Data

US 2013/0017112 A1   Jan. 17, 2013

Related U.S. Application Data

(63) Continuation of application No. 13/182,647, filed on Jul. 14, 2011.

(51) Int. Cl.
  *F04C 14/22* (2006.01)
  *F04C 2/344* (2006.01)
  *F16H 61/00* (2006.01)

(52) U.S. Cl.
  CPC .......... *F04C 2/3442* (2013.01); *F04C 14/226* (2013.01); *F16H 61/0021* (2013.01); *F04C 2270/585* (2013.01); *F16H 61/0025* (2013.01); *Y10T 137/0402* (2015.04)

(58) Field of Classification Search
  CPC .... F04B 49/002; F04B 49/005; F16H 61/439; F16H 61/0025; F15B 2211/20553; F04C 2/3442
  USPC .................................................. 60/433, 445
  See application file for complete search history.

(56) References Cited

U.S. PATENT DOCUMENTS

| | | | |
|---|---|---|---|
| 2,742,861 A | 4/1956 | O'Connor et al. | |
| 3,758,235 A * | 9/1973 | Breeden ................ | F04B 49/002 417/222.1 |
| 4,066,006 A * | 1/1978 | Heiser ............................ | 91/433 |
| 4,244,678 A | 1/1981 | Uehara et al. | |
| 5,129,424 A | 7/1992 | Stephenson et al. | |
| 5,579,244 A | 11/1996 | Brown | |
| 5,881,629 A * | 3/1999 | Gollner et al. ................. | 91/505 |
| 7,316,112 B2 | 1/2008 | Becker | |
| 7,430,859 B2 | 10/2008 | Jang et al. | |
| 7,484,814 B2 | 2/2009 | Dornbach | |
| 2003/0231965 A1 | 12/2003 | Hunter et al. | |
| 2008/0229739 A1* | 9/2008 | Dreher et al. ................. | 60/413 |
| 2010/0254828 A1 | 10/2010 | Frait | |
| 2011/0268587 A1 | 11/2011 | Dybing | |

\* cited by examiner

*Primary Examiner* — Logan Kraft
*Assistant Examiner* — Abiy Teka
(74) *Attorney, Agent, or Firm* — James Dottavio; MacMillan, Sobanski & Todd, LLC

(57) ABSTRACT

The present disclosure relates to a control circuit for a variable displacement pump in a vehicle transmission, including: a regulator valve configured to regulate displacement control fluid to the variable displacement pump; and a response limiter in communication with the regulator valve, configured to mitigate pressure oscillations in the control circuit.

19 Claims, 3 Drawing Sheets

CONTROL CIRCUIT FOR TRANSMISSION VARIABLE DISPLACEMENT PUMP WITH IMPROVED EFFICIENCY

CROSS-REFERENCE TO RELATED APPLICATIONS

This application is a continuation and claims the benefit of U.S. Non-Provisional application Ser. No. 13/182,647 titled "Variable Displacement Hydraulic Pump Control" filed Jul. 14, 2011, which is hereby incorporated by reference in its entirety.

TECHNICAL FIELD

The present disclosure relates to control circuits for a vehicle transmission pump, more particularly a variable displacement transmission pump.

BACKGROUND

Most modern transmissions are equipped with pumps. Transmission pumps are generally driven by the engine crankshaft. Of the sort of pumps that are compatible with today's transmissions are fixed displacement pumps and variable displacement pumps. Fixed displacement pumps provide the same flow per revolution output regardless of engine speed. A variable displacement pump (or VDP) provides a variable flow rate output which depends on engine speed and transmission system flow requirements (which are commonly referred to as "flow demand"). While there are tradeoffs associated with using either variable displacement or fixed displacement pumps, variable displacement pumps can reduce the total power consumed by the transmission pump by delivering only the flow required by the transmission hydraulic system. For most variable displacement pumps at lower speeds pump loss is directly proportional to engine speed and then pump loss plateaus over a certain speed. In this way, variable displacement pumps offer greater powertrain efficiency.

A displacement decrease circuit can be incorporated in hydraulic circuits for variable displacement pumps in order to provide a command pressure signal to actuate the bore ring yielding a lower displacement at higher speeds. A regulator valve can be incorporated in the hydraulic circuit to selectively link a displacement decrease circuit to the bore ring. Phase lag between the regulator valve and pump bore ring can cause oscillations in both line and decrease circuits (for example as shown in FIG. 6). In the past a controlled leakage has been incorporated in the displacement decrease circuit to mitigate oscillations. However, hydraulic controlled leakages may result in significant flow losses (or hydraulic losses) up to 20% of total typical transmission hydraulic flow demand. The hydraulic loss is proportional to displacement decrease pressure and increases with engine speed when the system commands low displacement (or higher decrease pressure). This hydraulic loss results in an overall increase of engine power required to maintain hydraulic flow and leads to a reduction in fuel economy.

Therefore, it is desirable to have a more effective control circuit for a variable displacement pump that mitigates pressure oscillations in the control circuit when the pump regulator valve is regulating the pump at a displacement less than the pump maximum level. There also exists a need for a method of manufacturing a hydraulic control circuit for a vehicle transmission pump having the same utility.

SUMMARY

The present disclosure addresses one or more of the above-mentioned issues. Other features and/or advantages may become apparent from the description which follows.

One exemplary embodiment pertains to a control circuit for a variable displacement pump in a vehicle transmission, including: a regulator valve configured to regulate fluid to the variable displacement pump; and a response limiter in communication with the regulator valve, configured to mitigate pressure oscillations in the control circuit.

Another exemplary embodiment pertains to a vehicle transmission with improved power efficiency, having: a variable displacement pump; a control circuit configured to control pump displacement through a regulator valve; and a response limiter in communication with the regulator valve, configured to mitigate pressure oscillations in the control circuit.

Another exemplary embodiment pertains to a method of manufacturing a hydraulic control circuit for a vehicle transmission pump, the method including: connecting a fluid sump to a pressure line; connecting a variable displacement pump to the pressure line; incorporating a regulator valve in the pressure line, the regulator valve configured to provide a displacement decrease pressure command to the pump; and incorporating a response limiter at one end of the regulator valve thereby reducing the regulator valve positional response to noise inputs.

One advantage of the present disclosure is that it teaches a more effective control circuit for a variable displacement pump that mitigates pressure oscillations in the control circuit when the pump regulator valve is regulating the pump a at displacement less than the pump maximum level.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

Figure 1:
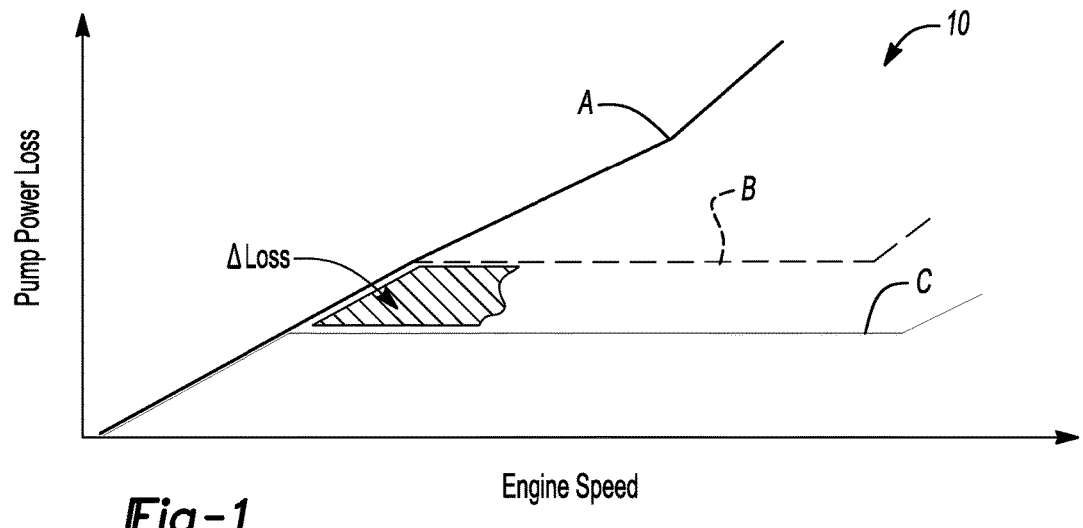
FIG. 1 is a graph of pump power loss over engine speed for several types of transmission pump systems.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings, FIGS. 1-5, wherein like characters represent the same or corresponding parts throughout the several views there are shown various embodiments of control circuits for a variable displacement pump in a vehicle transmission. The present control circuits improve pump efficiency by mitigating pressure oscillations in the control circuit when the pump regulator valve is regulating pressure by reducing command-pressure flow through the displacement pump—or feeding into a displacement decrease chamber for the variable displacement pump. Various response limiters are used in conjunction with a multi-stage regulator valve configured to regulate fluid to the variable displacement pump. The disclosed hydraulic circuits provide better control of the VDPs and reduce oscillation in the pump feedback circuit.

Referring now to FIG. 1, there is shown a comparative graph 10 of pump power loss over engine speed for several types of transmission pump systems. FIG. 1 shows hydraulic power loss comparisons between VDPs and fixed displacement pumps. As shown in FIG. 1, there is a pump loss associated with fixed displacement pumps that increases with engine speed. Line A in FIG. 1 represents the pump loss associated with fixed displacement pumps that increases with engine speed; pump loss is directly related to engine speed. There is also some pump loss associated with variable displacement pumps, as shown by Line B in FIG. 1. With VPDs flow output could be maintained constant when pump rotational speed increases. Change of the flow output is achieved by changing displacement of a pump or volume of fluid transported from the inlet to the outlet per revolution of a pump input shaft. As shown in FIG. 1, at lower speeds pump loss is directly proportional to engine speed however pump loss plateaus when pump output matches system requirement. Line B indicates a standard variable displacement pump not having the benefit of the present disclosure. Line C shows pump loss versus engine speed for a VDP having a control circuit according to one of the exemplary embodiments discussed hereinbelow. A change or reduction in pump loss, $\Delta_{LOSS}$, is indicated on the graph.

Figure 2:
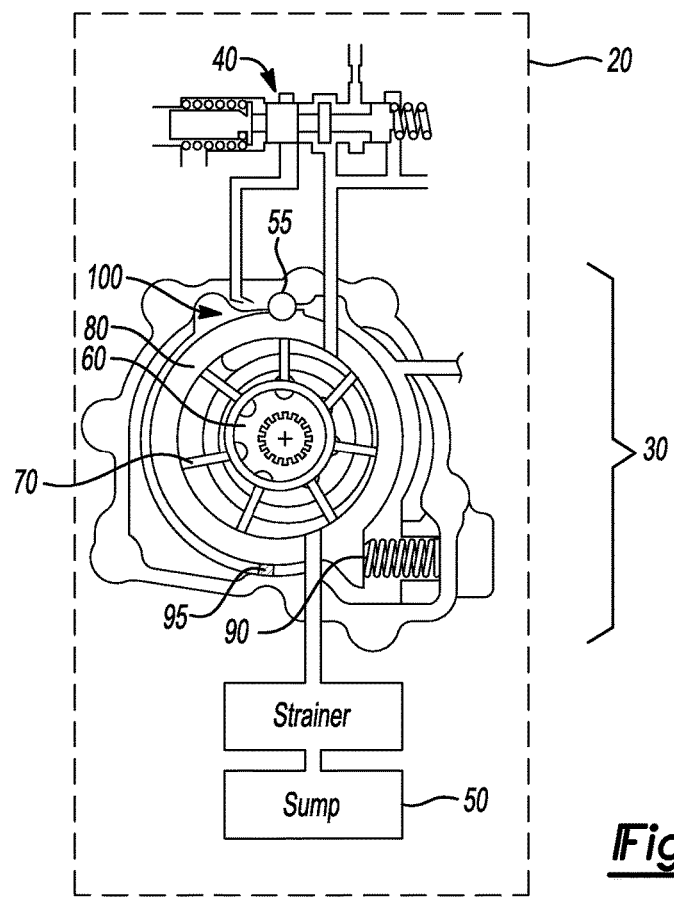
FIG. 2 is a schematic side view of a variable displacement vane pump compatible with an exemplary control circuit.

Referring now to FIG. 2, there is shown therein a vehicle transmission 20 having a VDP 30 connected to a main regulator valve 40. The VDP 30 is a variable displacement vane pump (or VDVP). System hydraulic pressure is commanded by the electronically controlled hydraulic valve 40 and maintained by a hydraulic control system that is in fluid communication with a transmission sump 50. Sump 50 is a low pressure exhaust circuit. In this embodiment the sump pressure is set to 0 psi or atmospheric pressure. In other embodiments, low pressure exhaust circuit is set to 3 psi.

As shown in FIG. 2, the control system regulates control signals to reduce displacement of the pump that exceed transmission flow requirements. A driven rotor 60 supports vanes 70 enclosed within an eccentric moveable bore ring 80 that enables the displacement of the pump to be reduced as the bore ring 80 pivots. Pivoting of the bore ring 80 decreases its eccentric position with respect to the driven rotor 60. A spring 90 acts on the moveable bore and biases bore towards the maximum eccentricity. A chamber 100 opposes spring 90, as shown in FIG. 2. Chamber 100 is sealed by fluid seal 95. In prior arrangements a bleed circuit was necessary and occurred at or around pin 55. The pressure in chamber 100, which is a displacement decrease pressure, is adjusted (or selectively energized with pressurized fluid) to counteract the spring load on the moveable bore, thereby pivoting the bore and reducing the bore eccentricity. Thus pump volumetric displacement is reduced by this displacement adjustment feature.

When additional flow is required to maintain system operating pressure, flow to the sealed chamber is reduced by regulating valve 40, thus reducing the force counteracting the spring 90. The moveable bore ring 80 changes position to equalize the forces, increasing pump flow to meet the additional flow demand.

Figure 3:
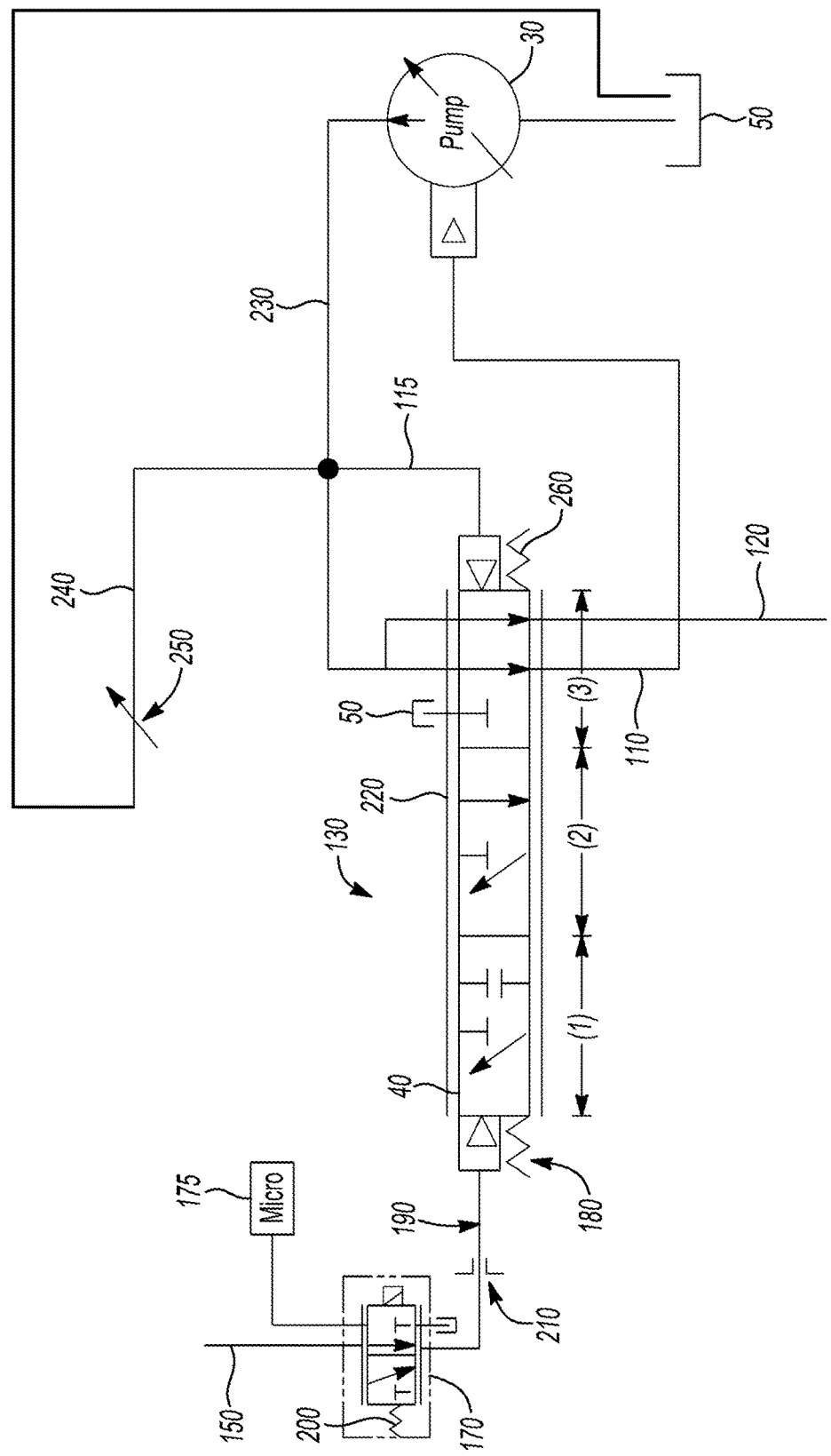
FIG. 3 is a schematic depiction of an exemplary control circuit for a variable displacement transmission pump.

FIG. 3 is a schematic depiction of an exemplary control circuit 130 for a variable displacement transmission pump 30. Output of the pump 30 is directed to both main regulator valve 40 through feedback circuit 115 and a transmission system 120 (as shown in FIG. 3 in parallel). The hydraulic control circuit 130 controls command pressure sent to the VDP 30 displacement decrease circuit 110 fed through sealed chamber 100 (as shown in FIG. 2) in the VDP.

A line pressure control solenoid 170, as shown in FIG. 3, controls the command pressure which actuates the main regulator valve 40. Line pressure control solenoid 170 is commanded electrically to output a predetermined pressure that also corresponds to a desired line pressure. The line pressure control solenoid 170 applies hydraulic force to the main regulator valve 40 in conjunction with a line pressure offset spring or driving spring 180, which is opposed by pressure force from line pressure circuit 230. Said opposition results in a balanced force at position or stage (3) which meters flow from line pressure feedback circuit 115 to decrease pressure circuit 110. The decrease pressure circuit 110 applies hydraulic force to the displacement adjustment feature in pump (or movable bore ring 80 as shown in FIG. 2) when a reduction in displacement (or line pressure) is required.

Line pressure control solenoid 170 has two stages. Solenoid valve 170 is spring biased towards the first stage (or a closed position) by return spring 200. Solenoid valve 170 is controlled by a microcontroller 175. Microcontroller 175, through solenoid valve 170, is configured to control regulator valve 40 according to transmission performance (e.g., speed, gear, temperature, or pressure). When the solenoid valve 170 is in the closed position, stage 1, line 190 is disconnected from the source line 150. Flow through control pressure line 190 is at least partially limited by orifice 210.

Main regulator valve 40, as shown in FIG. 3, is a regulator valve. Main regulator valve 40 is a spool valve positioned in a valve chamber 220 in this embodiment. In the first stage (1) line 230 (which is a portion of the pump outlet circuit) is disconnected from displacement decrease circuit 110 and prioritized oil circuit or line 120 (which is a Converted feed line). Line 110 is connector to sump 50; displacement decrease circuit 110 is not in direct fluid communication with the sump 50. In the second stage (2), line 230 is connected to line 120 while displacement decrease circuit 110 is connected to sump 50. In the third stage (3), both displacement decrease circuit 110 and prioritized oil circuit 120 are connected to line 230

Main regulator valve 40 is connected to feedback circuit 115 which is linked to a pump outlet passage 230, as shown in FIG. 3. A line pressure circuit 240 branches off from the outlet passage to the pump 30. The flow in the circuit is variable as indicated by demarcation 250. In this embodiment, the main regulator valve 40 metering flow gain is between 8-30 mm ^2/mm.

Noise response reduction spring 260 is a response limiter that acts to limit excessive main regulator valve position response due to noise input. Spring 260 is in communication with the regulator valve 40. Spring 260 is a coil spring configured to apply a resistive force on the regulator valve 40 in proportion to regulator valve travel towards a position closing fluid communication between the pump output circuit 230 and a displacement decrease circuit 110. No feedback circuit orifice is used in the embodiment shown in FIG. 3. Spring 180 is a driving spring configured to bias the regulator valve towards a position closing fluid communication between the pump output circuit 230 and the displacement decrease circuit 110. Springs 180 and 260 effectively center main regulator valve 40 on the metering edge. The relative spring constant ratio is 1:1 (180, 260, respectively). The springs 180, 260 used are a factor of 10 times higher rates than commonly used in this type of control system.

As shown, coil spring 260 acts as a system response limiter and opposes excessive valve movement in response to noise inputs such as changes to flow load. This type of noise input to the main regulator valve 40 results in excursions of main regulator valve due to: (1) the speed discrepancy between main regulator valve and displacement control mechanism in the pump (30 as shown in FIG. 3); and (2) the main regulator valve feedback signal which is pump output pressure 230, not regulated pressure, displacement decrease 110.

A method of manufacturing a hydraulic control circuit (e.g., as discussed in FIG. 3) for a vehicle transmission pump is discussed hereinbelow. This configuration provides greater efficiency and stability. The method includes: connecting a fluid sump to a pump (e.g., 50 as shown in FIG. 3); connecting a variable displacement pump to the pressure line (e.g., 30 as shown in FIG. 3); incorporating a regulator valve in the pressure line in parallel with the system, the regulator valve configured to provide a displacement decrease pressure command to the pump (e.g., 40 as shown in FIG. 3); and incorporating a response limiter at one end of the regulator valve thereby reducing the regulator valve positional response to noise inputs (e.g., 260 as shown in FIG. 3).

In one exemplary embodiment the method also includes the step of configuring the response limiter to apply a resistive force on the regulator valve in proportion to regulator valve travel towards a position closing fluid communication between a pump output circuit and a displacement decrease circuit. A centering spring 260 as shown in FIG. 3 can be used.

In another embodiment the method of manufacturing a hydraulic control circuit for a vehicle transmission pump includes restricting direct fluid communication between the displacement decrease circuit 110 and a low pressure exhaust circuit (e.g., sump 50 of FIG. 3), while connected to pump output 230. As shown in FIG. 3, the displacement decrease circuit 110 and sump 50 (which is an exemplary low pressure exhaust circuit) are indirectly in fluid communication through regulator valve 40. However, displacement decrease circuit 110 does not need to have a direct fluid line to sump 50 since bleed of the displacement decrease circuit is not needed.

In yet another embodiment, the method includes incorporating a micro-controller in the control circuit, configured to control the regulator valve according to transmission performance. E.g., 175 as shown in FIG. 3. The microprocessor can be a separate module or part of the powertrain control module.

Figure 4:
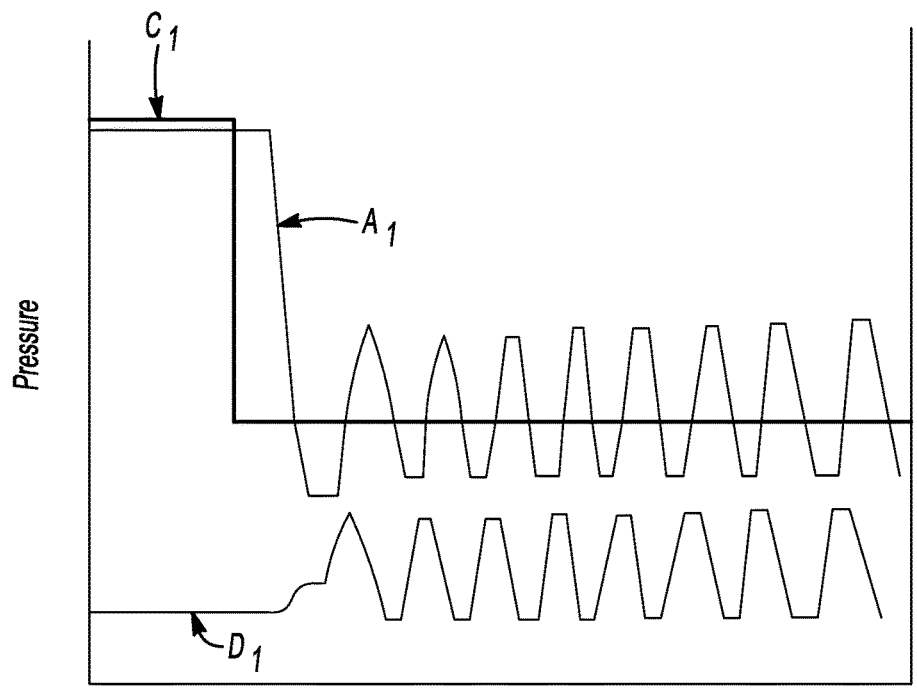
FIG. 4 is a plot of pressure fluctuations over time for a variable displacement pump not having the benefit of the present disclosure.
Figure 5:
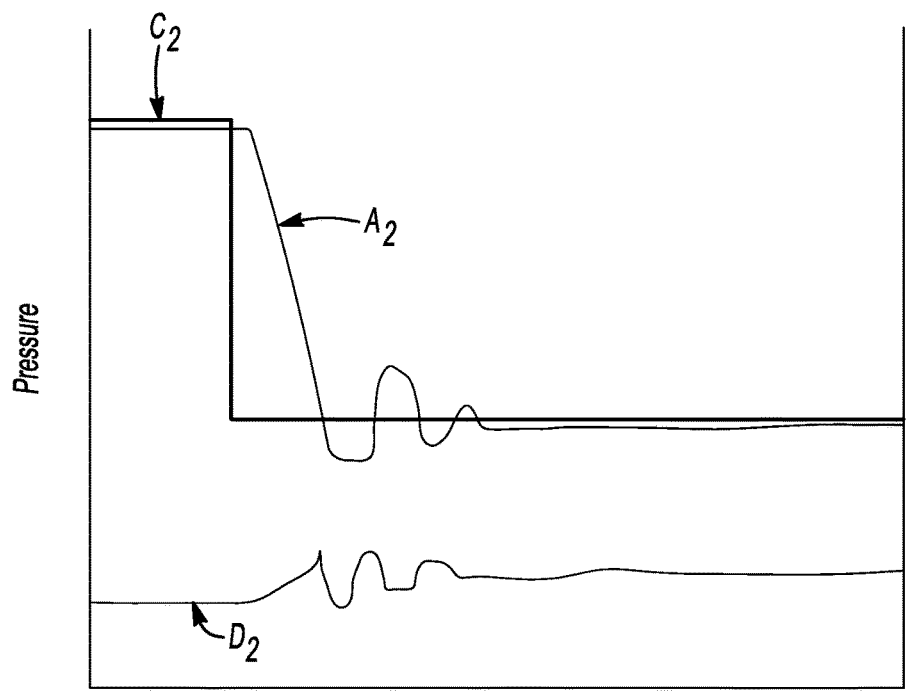
FIG. 5 is a plot of pressure over time for a variable displacement pump having a control circuit according to an exemplary embodiment of the present disclosure.

With reference now to FIGS. 4 and 5, there is shown therein two graphs of pressure over time with respect to a regulator valve for a VDP. A command pressure (as indicated by line C1 in FIG. 4) is delivered from the control valve to the VDP. The actual pressure signal, Line A1, to the pump varies according to fluctuations or oscillations in the decrease pressure circuit, shown as Line D1 in FIG. 4. FIG. 4 shows response lag in a case of eliminated a displacement decrease pressure circuit controlled leakage (or bleed) in the present system. A pressure over time plot is also shown for a hydraulic control circuit having a response limiter incorporated in a regulator valve assembly, in accordance with the present teachings. A response limiter (as discussed in FIG. 3) eliminates oscillations in the displacement decrease pressure circuit and thus reduces oscillations in the actual pressure Line A1 (as shown in FIG. 5). The decrease pressure circuit, as indicated by Line D2 has less oscillation thus resulting in less fluctuation in the actual pressure signal in the command line, Line A2. The command pressure, indicated by Line C1 & C2, is consistent between arrangements.

Those familiar with the art to which this invention relates will recognize various alternative designs and embodiments for practicing the invention within the scope of the appended claims.

We claim:

1. A control circuit for a variable displacement pump in a transmission, comprising:
   a hydraulically actuated regulator valve that regulates fluid flow from the valve to the variable displacement pump to vary displacement of the pump; and
   a response limiter biasing the regulator valve to mitigate hydraulic pressure oscillations in the control circuit and biasing the valve toward pump outlet pressure hydraulic fluid flowing through the valve to the transmission and a displacement decrease circuit.

2. The control circuit of claim 1, wherein the response limiter is configured to apply a resistive force on the regulator valve in proportion to regulator valve travel towards a position closing fluid communication between a pump output circuit and the displacement decrease circuit that directs fluid from the valve to the pump to vary displacement of the pump.

3. The control circuit of claim 2, wherein the response limiter is a centering spring configured to bias the regulator valve towards a position opening fluid communication between the pump output circuit and the displacement decrease circuit.

4. The control circuit of claim 3, wherein the control circuit includes a driving spring configured to bias the regulator valve towards a position closing fluid communication between the pump output circuit and the displacement decrease circuit;
   wherein a spring constant ratio between the driving spring and the centering spring is less than or equal to 1:1.

5. The control circuit of claim 1, further comprising:
   a low pressure exhaust circuit in fluid communication with the variable displacement pump; and
   wherein the displacement decrease circuit, which directs fluid from the valve to the pump to vary displacement of the pump, is not in direct fluid communication with the low pressure exhaust circuit.

6. The control circuit of claim 5, wherein the low pressure exhaust circuit is a sump.

7. The control circuit of claim 1, wherein the regulator valve is a spool valve.

8. A transmission, comprising:
   a variable displacement pump;

a control circuit controlling pump displacement through a hydraulically actuated regulator valve, which regulates fluid flow to the pump to vary displacement of the pump;

a response limiter biasing the regulator valve to mitigate pressure oscillations in the control circuit;

a line providing unrestricted hydraulic flow from a pump outlet to the valve, biasing the valve toward open communication from the pump outlet to a displacement decrease circuit; and wherein the response limiter biases the valve toward pump outlet pressure hydraulic fluid flowing through the valve to the transmission and the displacement decrease circuit.

9. The transmission of claim 8, wherein the response limiter is configured to apply a resistive force on the regulator valve in proportion to regulator valve travel towards a position closing fluid communication between a pump output circuit and the displacement decrease circuit that directs fluid from the valve to the pump to vary displacement of the pump.

10. The transmission of claim 9, wherein the response limiter is a centering spring configured to bias the regulator valve towards a position opening fluid communication between the pump output circuit and the displacement decrease circuit.

11. The transmission of claim 10, wherein the control circuit includes a driving spring configured to bias the regulator valve towards a position closing fluid communication between the pump output circuit and the displacement decrease circuit;

wherein a spring constant ratio between the driving spring and the centering spring is less than or equal to 1:1.

12. The transmission of claim 8, wherein the regulator valve is a spool valve.

13. The transmission of claim 8, further comprising:

a low pressure exhaust circuit in fluid communication with the variable displacement pump; and wherein the transmission is configured so that the displacement decrease circuit, which directs fluid from the valve to the pump to vary displacement of the pump, is not in direct fluid communication with the low pressure exhaust circuit.

14. The transmission of claim 13, wherein the low pressure exhaust circuit is a sump.

15. A method of manufacturing a hydraulic control circuit for a variable displacement pump of a transmission, comprising:

connecting a fluid sump to a pressure line;

connecting the variable displacement pump to the pressure line;

incorporating a hydraulically actuated regulator valve in the pressure line, the regulator valve configured to provide a displacement decrease pressure command to the pump and to regulate fluid flow from the valve to the pump to vary displacement of the pump; and incorporating a response limiter at one end of the regulator valve thereby reducing regulator valve positional response to hydraulic pressure oscillation inputs and the response limiter biases the valve toward pump outlet pressure hydraulic fluid flowing through the valve to the transmission and the displacement decrease circuit.

16. The method of claim 15, further comprising:

configuring the response limiter to apply a resistive force on the regulator valve in proportion to regulator valve travel towards a position closing fluid communication between a pump output circuit and the displacement decrease circuit that directs fluid from the valve to the pump to vary displacement of the pump.

17. The method of claim 16, further comprising:

restricting direct fluid communication between the displacement decrease circuit, which directs fluid from the valve to the pump to vary displacement of the pump, and a low pressure exhaust circuit.

18. The method of claim 17, wherein the restricting direct fluid communication between the displacement decrease circuit and low pressure exhaust circuit comprises restricting direct fluid communication between the displacement decrease circuit and a sump.

19. The method of claim 15, further comprising:

incorporating a micro-controller in the control circuit, configured to control the regulator valve according to transmission performance.

* * * * *